United States Patent [19]

Ewen et al.

[11] Patent Number: 5,433,484
[45] Date of Patent: Jul. 18, 1995

[54] DOUBLE CONTAINMENT PIPE AND FITTING JOINT

[75] Inventors: Alec Ewen, Nazeing, United Kingdom; Robert Gurney, Lake Bluff, Ill.; John Lloyd, Deerfield, Ill.; Michael Potts, Grayslake, Ill.

[73] Assignee: Enfield Industrial Corporation, Lake Bluff, Ill.

[21] Appl. No.: 152,841

[22] Filed: Nov. 15, 1993

[51] Int. Cl.6 ............................................. F16L 13/02
[52] U.S. Cl. ........................................ 285/21; 285/138; 285/423
[58] Field of Search ............... 285/21, 22, 133.1, 138, 285/423; 156/273.9, 274.2, 379.7; 219/535, 544

[56] References Cited

U.S. PATENT DOCUMENTS

| | | |
|---|---|---|
| 3,094,452 | 6/1963 | Von Riegen et al. . |
| 3,506,519 | 4/1970 | Blumenkranz . |
| 4,157,194 | 6/1979 | Takahashi . |
| 4,280,535 | 7/1981 | Willis . |
| 4,365,144 | 12/1982 | Reich et al. . |
| 4,530,520 | 7/1985 | Nyffeler et al. . |
| 4,530,521 | 7/1985 | Nyffeler et al. . |
| 4,695,335 | 9/1987 | Lyall . |
| 4,723,441 | 2/1988 | Sweeney . |
| 4,786,088 | 11/1988 | Ziu . |
| 4,801,349 | 1/1989 | Dommer et al. . |
| 4,842,305 | 6/1989 | Kistenich et al. . |
| 4,886,305 | 12/1989 | Martin ..................... 285/133.1 |
| 4,906,313 | 3/1990 | Hill . |
| 4,922,971 | 5/1990 | Grantham ............... 285/133.1 X |
| 4,930,544 | 6/1990 | Ziu . |
| 4,932,257 | 6/1990 | Webb . |
| 5,018,260 | 5/1991 | Ziu . |
| 5,087,308 | 2/1992 | Wermelinger . |
| 5,116,082 | 5/1992 | Handa et al. . |
| 5,169,176 | 12/1992 | Brossard ............................. 285/21 |
| 5,184,850 | 2/1993 | Wermelinger . |
| 5,187,747 | 2/1993 | Jovero ............................... 285/21 |
| 5,252,157 | 10/1993 | Inhofe, Jr. . |

Primary Examiner—Dave W. Arola
Attorney, Agent, or Firm—Lockwood, Alex, Fitzgibbon & Cummings

[57] ABSTRACT

A welded joint for a thermoplastic double containment pipes is formed by an apparatus including an electrofusion welding sleeve placed over the primary pipe, an electrofusion welding sleeve placed over the secondary pipe, clamps which concentrate their clamping pressure at preselected areas on the secondary pipe sleeve and anchor plates located on one or both opposite sides of the joint.

21 Claims, 2 Drawing Sheets

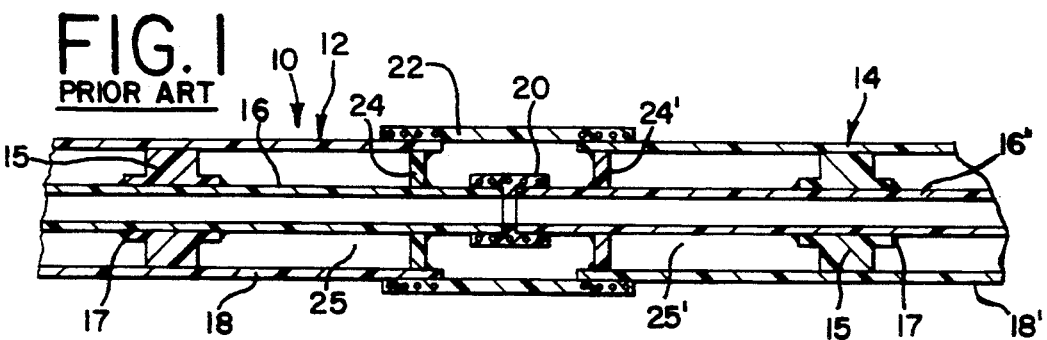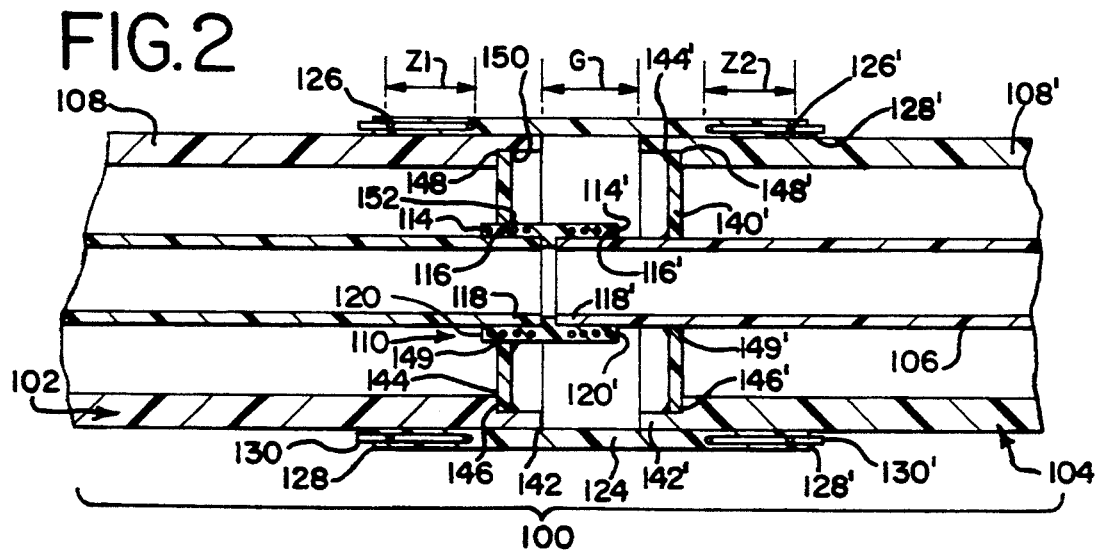

DOUBLE CONTAINMENT PIPE AND FITTING JOINT

BACKGROUND OF THE INVENTION

The present invention relates generally to double containment piping systems and, more particularly, to field-fabricated joints for such piping and a method of making such joints between adjacent pipe lengths and/or fittings.

Thermoplastic pipes are widely used in the chemical and petrochemical industries because of their low cost, light weight and ability to withstand prolonged exposure to chemicals which may have a deleterious affect on other, non-plastic piping. Because of the chemical resistance of thermoplastic pipes, they are also commonly used in the construction of double containment piping systems. In double containment piping systems, an inner carrier pipe which conveys the system fluid is surrounded, or enclosed by an outer containment pipe which collects any system fluids which may leak from the inner carrier pipe. The outer containment pipe serves as a barrier between the environment and the system fluids conveyed by the carrier pipe. Double containment piping systems are made up of numerous pipe lengths and fittings which are interconnected by various joints. The joints of adjacent pipe sections need to have a structural integrity which is equal to or greater than that of the pipe sections themselves.

There are many joints known for double containment piping systems in the art. For example, U.S. Pat. No 4,157,194 issued Jun. 5, 1979 and describes a thermoplastic double containment pipe system. The joints of this piping system require separately formed joint members which are inserted into opposing ends of the primary pipe portions and either rod welded or extrusion welded together.

U.S. Pat. No. 4,930,544, issued Jun. 5, 1990 and describes a restraining coupling which joins opposing end portions of thermoplastic double containment pipes together. This restraint coupling has a complex shape, thereby increasing its manufacturing cost, and may not be joined to the opposing pipe section by a welding sleeve, but rather requires rod or extrusion welding.

U.S. Pat. No. 5,087,308, which issued Feb. 11, 1992, describes a method of joining double containment pipes together wherein thermoplastic carrier and containment pipes are joined together by electric welding sleeves. The joint described in this patent between the outer containment pipes requires a spacer ring to complete a small gap between opposing end portions of the containment pipes prior to the welding sleeve being inserted in place. The gap filled by this ring is not large enough to permit access to the primary pipe welding sleeve for repair.

None of the above patents provide for a double containment piping joint for thermoplastic pipes in which the joint has improved structural characteristics.

SUMMARY OF THE INVENTION

The present invention is therefore directed to an improved double containment pipe joint and a method for forming same which joint provides for a reduction of materials and better structural resistance to thermal pipe movement.

One principal aspect of the present invention accomplishes these ends by providing a joint between two opposing double containment pipe sections wherein each section has an inner primary pipe held within an outer secondary pipe, the opposing ends of the primary pipes of each pipe section projecting partially past the opposing ends of the secondary pipes, the primary pipes being joined together by a first welding coupling which defines a predetermined gap between opposing end portions of the secondary pipes. An annular space exists between the primary and secondary pipes in each pipe section and accommodates at least one anchor plate attached to a primary pipe and extending radially outwardly to abuttingly engage a shoulder on an associated secondary pipe, the shoulder being defined by an annular recess formed in the secondary pipe. The anchor plate is attached to the secondary pipe at the recess thereof and provides a support which resists thermal expansion and contraction movements of the primary pipe. A second welding coupling extends over the opposing secondary pipes and bridges the gap formed between the opposing secondary pipes, the second coupling having two distinct welding zones defined therein by electrical resistance wires, the welding zones being disposed on opposite sides of the joint and adjacent the end portions of the secondary pipes. Clamping members are used to maintain the second coupling and secondary pipes in intimate contact during the welding together thereof and, because of an internal annular groove disposed in the center of the clamping member, molten plastic of the sleeve and the abutting secondary pipes is prevented from flowing outside of the joint during welding.

In another principal aspect of the present invention, an electrofusion welding assembly is provided for a double containment pipe which includes a generally cylindrical electrofusion welding sleeve of uniform diameter and which slidingly engages opposing end portions of the secondary pipes, the welding sleeve having two separate sets of resistance wires embedded in the inner peripheral surface of the sleeve generally adjacent opposing ends of the sleeve such that areas of the sleeve containing resistance wires define welding zones of the sleeve which abut the outer surfaces of the secondary pipes when the sleeve is slid over the gap created between the secondary pipes, the assembly further including a clamping member adapted to securely engage the outer surface of the sleeve when installed in the secondary pipes, the clamping member having a central groove portion disposed on its inner peripheral surface between two adjoining raised land portions, the raised land portions thereby concentrating the pressure of the clamping member generally to the outer edges of the welding zones during installation of the sleeve to prevent the flow of molten plastic out from the area of the resistance wires and maintain the molten plastic in place during welding.

In yet another principal aspect, the present invention offers a double containment pipe joint having improved structural resistance due to the formation of two annular recesses in opposing end portions of the secondary pipes associated with the joint, each of the recesses including a raised shoulder portion which engages anchor plates located on opposite sides of the joint and which extend radially outwardly from the primary pipe to the secondary pipe recess. The anchor plates are attached to the primary and secondary pipes and provide improved structural resistance against thermal movement of the primary pipe within the secondary pipe at the joint.

Accordingly, it is an object of the present invention to provide an improved double containment pipe joint and a method of making same which has improved structure resistance against thermal movement of the primary pipe within the secondary pipe.

Another object of the present invention is to provide an anchor plate assembly for use in a double containment pipe joint wherein the assembly includes a cylindrical welding coupling having two distinct welding zones defined therein, which welding zones are located adjacent the outer surface of the opposing secondary pipes of the joint and a means for clamping the welding coupling to the secondary pipes, the clamping means having two raised land portions separated by an intervening groove portion, and the land portions defining clamping means pressure faces located approximately at the ends of the coupling welding zones.

Still another object of the present invention is to provide a unique clamp for use with an electrofusion coupling or sleeve wherein the clamp extends around the outer circumference of the welding sleeve and is hinged to permit easy application and removal to the sleeve at a secondary pipe joint. The clamp further has an inner surface adapted to engage the outer surface of the sleeve, the inner surface having a central channel defined therein separating two radially extending land portions. When applied to the sleeve, these lands concentrate the pressure of the clamp on portions of the sleeve at the edges of the electric resistance wire in the inner surface of the sleeve.

Yet another object of the present invention is to provide a method for forming an improved joint for a double containment piping system wherein the method includes joining together opposing primary pipe portions with an electrofusion welding sleeve so as to define a gap having a specified length between opposing ends of the secondary pipes of the joint, testing the integrity of the primary pipe joint, clamping a second electrofusion welding sleeve to the opposing secondary pipes in a manner such that the outer peripheral edges of the clamps engage the outer edges of two welding zones defined in the second sleeve.

These and other objects, features and advantages of the present invention will become apparent from a reading of the following detailed description.

BRIEF DESCRIPTION OF THE DRAWINGS

In the course of the following detailed description, reference will be made to the attached drawings wherein like reference numerals identify like parts and wherein:

FIG. 1 is a sectional view of a prior art double containment pipe joint;

FIG. 2 is a sectional view of a double containment joint constructed in accordance with the principles of the present invention;

FIG. 3 is a force diagram showing the forces which are imposed upon the joint of FIG. 2 due to thermal movement;

FIG. 4 is a perspective view of a secondary pipe coupling used in the assembly of the joint of FIG. 2;

DETAILED DESCRIPTION OF THE INVENTION

Figure 5:
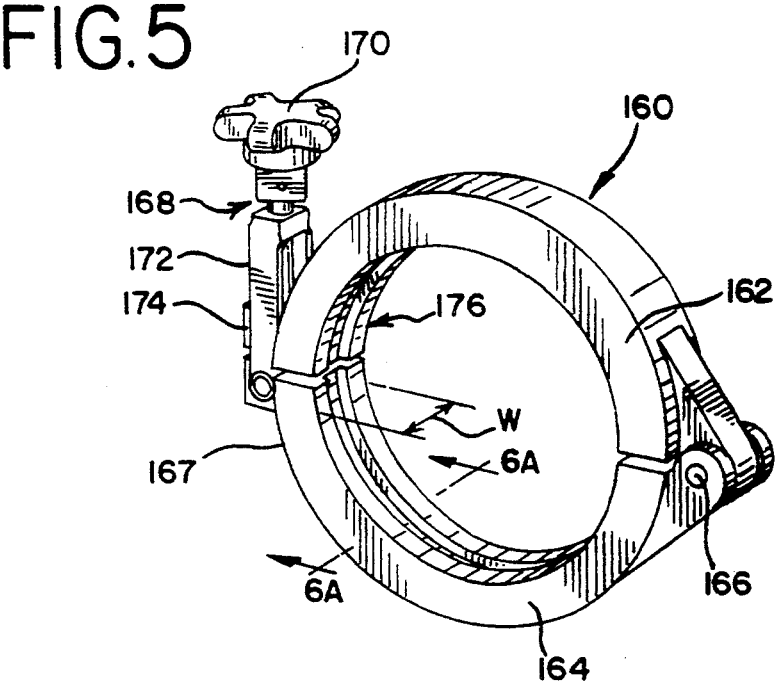
FIG. 5 is a perspective view of a pipe clamp constructed in accordance with the principles of the present invention and used to apply the coupling of FIG. 4 to the joint of FIG. 2.

FIG. 1 illustrates a double containment pipe joint 10 representative of the prior art wherein one double containment pipe section 12 is joined to another opposing double containment section 14 in a general end to end and coaxial relationship. It will be understood that as used herein, the term pipe "section" is to be given its broadest interpretation possible and, as such, shall include both pipe "lengths" as shown in the Figures and pipe "fittings" by which multiple pipe lengths are joined together. Each pipe section 12, 14 has a primary pipe portion 16, 16' and a secondary pipe portion 18, 18'. Throughout this detailed description, a reference numeral having a prime will refer to an element located on one side of the centerline C of the joint which has a corresponding element located on the opposite side of the centerline.

The primary pipe portions 16, 16' are supported within their respective secondary pipe portions 18, 18' by pipe supports 15 which are attached to the primary pipes 16, 16' by welds 17. The primary pipe portions 16, 16' are joined by an electrofusion welding sleeve 20 which is utilized to weld the two primary pipe portions 16, 16' together. The secondary pipe portions 18, 18' are similarly joined together by an electrofusion welding sleeve 22 which slides over the secondary pipes 18, 18' and over a gap which may occur between them. In such a joint construction, the primary pipes 16, 16' are typically joined together at the first sleeve 20. The integrity of the joint between the primary pipe portions 16, 16' is tested. After such testing proves positive, the secondary pipes 18, 18' are brought together and also joined together with an electrofusion welding sleeve 22. The secondary pipe joint is then also tested to determine its integrity. As stated above, the primary pipes 16, 16' may be supported within the secondary pipes 18, 18' by supports 15, but may also be anchored within the secondary pipes 18, 18' by anchors 24 which sit in the annular space 25 and which are welded to the outer surfaces of the primary pipes 16, 16' and the inner surfaces of the secondary pipes 18, 18'. The weld between the anchors 24 and the primary and secondary pipes develop a shearing stress when one of the two pipes moves relative to the other pipe.

FIG. 2 illustrates a double containment pipe joint 100 constructed in accordance with the principles of the present invention. The joint 100 generally includes two opposing double containment pipe sections 102 and 104 which are preferably coaxially aligned. Each double containment pipe section 102, 104 includes respective primary pipe portions 106, 106' and secondary pipe portions 108, 108'. The primary pipes 106, 106' may be supported within the associated outer secondary pipes 108, 108' by conventional support members similar to that shown in FIG. 1 which may consist of a saddle which is welded to the primary pipes 106, 106' and further having support legs which extend radially outwardly into contact with the inner surfaces of the secondary pipes 108, 108'. These supports provide support for the primary pipes 106, 106' within their outer secondary pipes 108, 108'.

Returning to FIG. 2, the joint 100 includes a first elongated coupling 110 having an inner diameter generally equal to the outer diameter of the opposing primary pipe portions 106, 106'. The coupling 110 may have an internal rib 112 as shown, which seats against the opposing endfaces 114, 114' of the primary pipe portions 106, 106', or it may have a constant inner diameter for its entire length. In its most preferred embodiment, the first coupling 110 has an inner rib 112 which is used to position the first coupling in place on primary pipe 106 to give a specific longitudinal distance between the outer secondary pipe portions 108, 108' to be joined. The coupling 110 may be attached to the primary pipe portions 106, 106' by a variety of means, such as by adhesives, plastic solvents or by electrofusion welding, but electrofusion welding is the preferred method of joining.

In this regard, and as shown best in FIG. 2, the coupling 110 includes electrical resistance wires 116, 116' integrally embedded within the coupling 110 near the inner surface thereof. This resistance wire 116, 116' is preferably formed from a suitable nichrome alloy that provides for uniform electrical resistance and thus uniform heating. The wires define two heating, or welding zones, 118, 118' located in opposing end portions 120, 120' of the coupling 110. Each welding zone 118, 118' of the coupling 110 is preferably spaced apart from the pipe endfaces 114, 114' thereof. Electrical current is provided by means of an electrofusion control unit which applies direct current and voltage to the welding coupling resistance wire in a time controlled manner to terminal posts (not shown) to energize the resistance wires 116, 116'. As the temperature of the wires 116, 116' increases (typically taking from between 1 and 2 minutes), it causes adjacent portions of the primary pipes 106, 106' and coupling 110 to melt, thereby forming a thermoplastic weld between the primary pipes 106, 106' and coupling 110. The coupling 110 is clamped in place during the welding process.

The secondary pipes 108, 108' of each opposing pipe section 102, 104 are joined together in a similar manner by use of an electrofusion welding coupling 124 which preferably has a constant inner diameter. The second coupling 124 is also made out of a thermoplastic material and has electrical resistance wires 126, 126' disposed therein proximate to the endfaces 128, 128' of the coupling 124 to define two distinct heating, or welding zones $Z_1$, $Z_2$ which are separated by a gap $G_S$ along the longitudinal axis of the coupling 126.

As best shown in FIG. 4, the resistance wires 126, 126' are embedded in the inner surface 127 of the coupling 124, preferably in a general "zig-zag" pattern, that is, the wires form a plurality of wire turns 129 which extend generally parallel to the longitudinal axis of the coupling 124 rather than circumferentially as in conventional electrofusion welding couplings. The wires 126 terminate in exterior terminal posts 130, 130' which provide points of connection for external power leads (not shown) to effect energization of the wires 126, 126'. As explained in greater detail below, when electrical current is passed through the resistance wires 126, 126', the heat generated thereby causes the plastic of the coupling 124 and secondary pipes 108, 108' to melt within the welding zones $Z_1$, $Z_2$ to fuse the coupling 124 and secondary pipes 108, 108' together.

In an important aspect of the present invention, the joint 100 preferably includes means for resisting thermal movements in forces generated within the pipe in the form of anchor plates 140, 140' (FIG. 2) located in the opposing pipe sections 102, 104 on opposite sides of the centerline of the joint 100. Importantly, the end portions 142, 142' of the secondary pipes 108, 108' each contain an annular recess 144, 144' formed therein such as by carving, reaming or molding. These recesses 144, 144' form radially extending shoulders 146, 146' which provide engagement surfaces that the anchor plate outer edges 148, 148' abut against. These engagement surfaces provide a surface which the anchor plates 140, 140' actively bear against during thermal movement of the pipes during operation. This thermal movement may be either expansion or contraction.

FIG. 3 is a simplified force diagram illustrating the functions of the annular recesses 144, 144' and anchor plates 140, 140'. In general, a double containment piping system, as with any piping system, will generally attain the same temperature as its surrounding environment, whether the pipe section is embedded in the ground in a trench or supported in the open and exposed to the environment. When a hot fluid is conveyed through the inner primary pipe, the increase in temperature will ordinarily cause thermal expansion of the primary pipe relative to the secondary pipe. In this expansion, the primary pipe grows a specific amount related to the coefficient of thermal expansion of the pipe material. In its most simplified sense, this expansion is indicated by the arrow $F_T$ and produces a thermal expansion force $F_T$ which bears against both anchor plates 140, 140'. The anchor plate 140 engages the recess shoulder 146 and effectively withstands and resists this thermal expansive movement (as represented by $R_T$). This shoulder 146 serves to eliminate shearing stress on any weld joining the anchor plate 140 to the secondary pipe which would be applied to such a weld where no shoulder is present.

In instances where the primary pipe 106 is extruded, a stress may be introduced into the pipe during extrusion and exists as a residual tensile stress within the primary pipe. Thus when the primary pipe is heated, this tensile prestress is relieved and the primary pipe will tend to contract inwardly of itself as indicated by the arrow $F_{TP}$ and produces a contraction force $F_{TP}$, which the anchor plate 140' on the right hand side of joint 100 effectively resists (as represented by $R_{TP}$) because of its supporting recess shoulder 146'. This type of contraction force may also occur in pipes having no prestress, such as in instances where the primary pipe carries fluids having a lower temperature than the pipe and its surroundings.

The anchor plates 140, 140' are attached to their associated primary and secondary pipes, 106, 106' and 108, 108' by means such as welds 150, 152 shown as fillet welds (FIG. 2.) These welds 150, 152 may be effected by rod welding or by extrusion welding. Regardless of the welding process chosen, the anchor plates 140, 140' are preferably welded to the primary pipes 106, 106' along the anchor plate inner edges 149 and also to the secondary pipes 108, 108' at the anchor plate outer edges 148. As shown in FIG. 2, the anchor plate 140 may also be attached at its inner edge 149 to the first coupling 110 and still be considered as attached to the primary pipe 106. The anchor plates may also contain additional openings located near their outer edge 148 which openings serve as drainage ports or accommodate a leak detection cable which runs the length of the piping system.

In yet another important aspect of the present invention, a clamping member 160 is used in conjunction with the second welding coupling 124 to maintain the intimacy of the fit between the inner surface of the second coupling 124 and the outer surfaces of the secondary pipes 108, 108' in proximity to the welding zones $Z_1$, $Z_2$ of the second coupling 124. FIG. 5 illustrates such a clamping member 160 having two halves 162, 164 which are interconnected together by hinge 166 at one end and, at its opposing end 167, by a selectively variable pressure application assembly 168 which includes a hand screw 170 threadedly mounted within a support frame 172 and which impinges upon a pressure block 174.

Figure 6A:
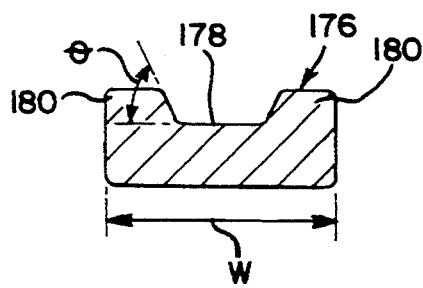
FIG. 6A is a cross-sectional view of the clamp of FIG. 5 taken along lines 6—6 thereof.
Figure 6B:
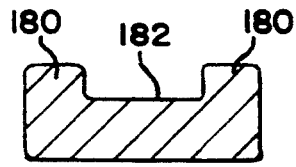
FIG. 6B is a cross-sectional view of an alternate embodiment of the configuration of the inner peripheral contact of the pipe clamp of FIG. 5.

The inner surface 176 of the clamping member 160 may be aptly characterized as generally circular and preferably has a width, W, which may be equal to or slightly less than the width of either of the second welding coupling heating zones $Z_1$, $Z_2$. The inner surface 176 preferably has a central groove portion 178 extending around its circumference and which is disposed between two adjoining raised land portions 180. The land portions 180 extend radially away from the groove portions (radially inwardly toward the center of the second coupling 124) and may extend away therefrom at either an angle $\theta$ as shown in FIG. 6A, or generally perpendicular therefrom as shown in 6B to define a rectangular channel 182 located between the lands 180. Clamping members with groove portions having a depth of approximately one-eighth inch and a width of three-quarters inch and land portions having a width of approximately one-half inch have been found to give suitable results. Preferably, the groove portions 178 have a width which is approximately between 70% and 80% of the width of the heating zones $Z_1$, $Z_2$ defined by the resistance wires 126, 126'. The clamping members 160 may have an inner diameter ranging from between approximately equal to the outer diameter of the secondary pipes to approximately three-sixteenths inch greater than the outer diameter of the secondary pipes.

Figure 7:
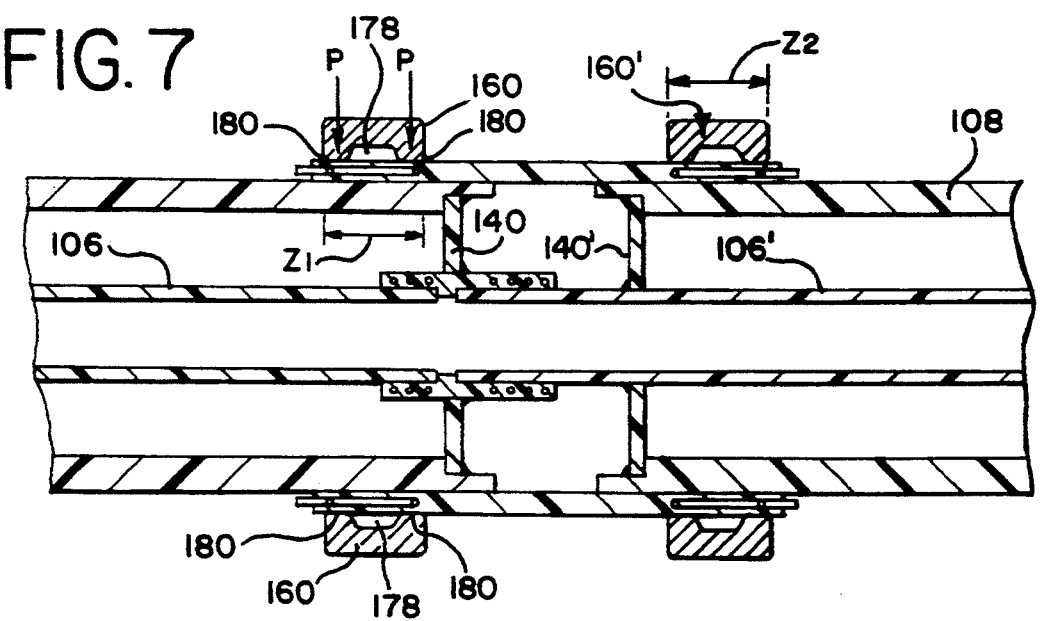
FIG. 7 is a sectional view of the pipe joint of FIG. 2 showing the clamps of FIG. 5 in place.

Not only do the clamping members 160 maintain the intimacy of the fit between the second coupling 124 and the secondary pipes 108, 108' but they also apply a dual clamping force (shown by arrows P in FIG. 7)onto the second coupling 124 in each welding zone $Z_1$, $Z_2$ at the opposing ends of the resistance wires 126, 126'. This dual force substantially prevents migration of the molten plastic and migration of the resistance wires 126, 126' during welding.

Joints constructed in accordance with the present invention result in a savings of material in that it has been found that the overall length of the second welding couplings 124 may be reduced as compared to other conventional couplings. Additionally, the joints 100 offer improved structural resistance in that they resist both types of thermal movement encountered in piping systems, expansion and contraction. In this regard, the anchor plates 140, 140' may be located at equal distances from the endfaces of the secondary pipe portions 108, 108' to effect a balancing of the forces applied the pipes at the joint 100.

The joints 100 of the present invention are easily installed as follows. The end portions of the pipe sections 102, 104 are prepared by cleaning and deburring the endfaces of the primary pipes 106, 106'. The annular recesses 144, 144' may be previously formed in the ends of the secondary pipes 108, 108' to define a shoulder 146, 146' in each secondary pipe end portion or may be formed during the installation process.

A first welding coupling 110 may then be fitted over the primary pipe 106 and electrofusion welded thereto, and its associated anchor plate 140 is subsequently inserted into the annular space of pipe section 102 so that its inner edge 149 abuttingly contacts the outer surface of the first coupling 110 and its outer edge 148 abuttingly engages the shoulder 146. The anchor plate 140 is then welded into place by welding the inner and outer edges of the anchor plate 140 respectively to the first welding coupling 110 and the secondary pipe 108. The primary pipe 106 of pipe section 102 extends for a predetermined length past the secondary pipe endface, vis-a-vis the first welding coupling 110. This length determines the gap, G, which occurs between the secondary pipes 108, 108'. The first coupling 110 is also preferably clamped in place on the primary pipe portions 106, 106' during the welding thereof. The opposing primary pipe portion 106' is then inserted into the first coupling 110 and current is applied to the resistance wires 116, 116' to fusion weld the primary pipe 106' and coupling 110 together.

The primary pipe connection is then tested by a suitable means to determine the integrity of the primary joint. If the primary pipe joint proves fluid tight, the second welding coupling 124 is slid over the gap G and the opposing end portions of the secondary pipes 108, 108' until the heating zones are located above the outer surfaces of the secondary pipe 108, 108' near the end portions of the pipes 108, 108'. If the primary pipe joint is not fluid tight, current may be reapplied to the first coupling 110 to reweld the primary joint.

Clamping members 160 are then applied to the second coupling 124 and are positioned over the welding zones $Z_1$, $Z_2$ so that the clamping members insure the intimacy of contact between the second coupling and secondary pipes in the welding zones of the second coupling 124. Pressure is applied to the clamping members 160, and in instances where the clamping members 160 contain central groove portions 178 in the inner surfaces, the clamping members 160 are positioned on the sleeve so that the groove portion 178 are approximately centered over the welding zones, $Z_1$, $Z_2$ of the sleeve. In such a position, the adjoining land portions 180 of the clamping member 160 rest on the sleeve approximately above the end portions of the resistance wires 126, 126' in the welding zones.

Leads from an external power supply are connected to the terminal posts 130, 130' of the second coupling 124 and current is passed through the wires 126, 126'. As the plastic at the interface of the coupling 124 and secondary pipes 108, 108' melts, the pressure of the land portions 180 keeps the plastic from migrating out of the interface area above the welding zones. This pressure also prevents the resistance wires from migrating during welding. After the secondary joint is formed when the plastic cools, the clamping members 160 are removed.

The present invention will work effectively with all thermoplastic double containment pipe materials of construction such as, for example, polyethylene, polypropylene, polyvinylchloride, polyvinylidene and the like.

While the preferred embodiments of the invention have been shown and described, it will be obvious to those skilled in the art that changes and modifications may be made therein without departing from the true spirit and the scope of the invention.

We claim:

1. An improved electrofusion weld assembly for forming a fusion weld between two opposing thermoplastic pipe sections having approximately the same outer diameter, the electrofusion weld assembly comprising, in combination:

an elongated thermoplastic welding sleeve having a preselected length and a generally constant inner diameter which closely approximates the outer diameter of said two pipe sections, the sleeve having electrical resistance wire embedded in said sleeve at the inner diameter thereof, said resistance wire forming two electrofusion welding zones of said sleeve, and a clamping member for insertion over said sleeve and for applying pressure to said sleeve when inserted over said two pipe sections, the clamping member having two halves which define an opening for receiving said sleeve therein, the clamping member halves together having a circular pressure face, the pressure face having a central groove portion disposed between two radially extending land portions, the groove portion being approximately no greater than a width of one of said sleeve electrofusion welding zones.

2. The weld assembly of claim 1, wherein said electrical resistance wire is embedded in said sleeve generally parallel to a longitudinal axis of said sleeve.

3. The weld assembly of claim 1, wherein said clamping member land portions extend approximately one-eighth inch radially away from said groove portion.

4. The weld assembly of claim 1, wherein said clamping member two halves are hingedly joined together and include selectively adjustable screw means for exerting pressure on said sleeve.

5. The weld assembly of claim 1, further including two respective inner pipes disposed within each of said two opposing pipe sections such that said opposing pipe sections surround said inner pipes and form an annular space therebetween, an annular shoulder formed in an end portion of one of said two opposing thermoplastic pipe sections to define a restraint surface in said end portion and an anchor plate rigidly attached to one of said two inner pipes and extending from said one inner pipe to the annular shoulder restraint surface of said one opposing pipe sections, said anchor plate having an outer radial portion which bears against said annular shoulder restraint surface, whereby said annular shoulder restraint surface and said anchor plate cooperate to resist movement of said inner pipes in at least one direction with respect to said opposing pipe sections.

6. The weld assembly of claim 1, further including two respective inner pipes disposed within each of said two opposing pipe sections such that said opposing pipe sections surround the inner pipes and constitute outer pipes of said pipe sections, the outer pipes being spaced away from said inner pipes by an annular space therebetween, said assembly further including two annular shoulders formed in opposing end portions of said two pipe sections, each of the two shoulders defining a restraint surface and having an anchor plate associated therewith, said weld assembly further including two anchor plates, one of said anchor plates being associated with one of said annular shoulders and the other of said anchor plates being associated with the other of said annular shoulders, each of said anchor plates being rigidly attached to said inner pipes at said inner peripheral edges and engaging said opposing pipe sections annular shoulders such that said annular shoulder restraint surfaces provide resistance to movement of said inner pipes and anchor plates.

7. In a joint for a thermoplastic double containment piping system between two opposing sections of thermoplastic double containment pipes, each of the opposing pipe sections having an inner primary pipe portion surrounded by an outer secondary pipe portion, the inner primary pipe portions and outer secondary pipe portions of said two pipe sections each being joined together by pipe connection means, the improvement comprising: means for resisting thermal movement of said two pipe sections during operation of said system, said thermal movement resistance means including an annular recess formed in each opposing end of said secondary pipe portions and two anchor plates, each of the anchor plates having an inner edge and an outer edge, said anchor plates being received in opposing annular spaces defined between opposing primary and secondary pipe portions of said two pipe sections, each of said anchor plates extending radially from said primary pipe portion toward said secondary pipe portion into said secondary pipe recess such that an outer edge of said anchor plate abuttingly engages a shoulder defined by said recess, said anchor plate further being attached to said primary pipe portion at its inner edge and attached at its outer edge at said recess.

8. The joint of claim 7, wherein said anchor plate is attached to said primary pipe portion by plastic rod welding.

9. The joint of claim 7, wherein said primary pipe portion includes a coupling interconnecting said two opposing pipe section primary pipe portions and said anchor plate is attached to said coupling at said inner edge of said anchor plate.

10. A joint for thermoplastic double containment piping system between two opposing thermoplastic double containment pipe components having improved structural resistance characteristics, the joint comprising: each of the opposing pipe components having an inner primary pipe portion surrounded by an outer secondary pipe portion, the inner primary pipe portions and outer secondary pipe portions of said two pipe components each being joined together by a pipe connector member, means for resisting thermal movement of said primary pipe portions relative to said secondary pipe portions during operation of said piping system, said thermal movement resistance means including two annular recesses disposed in opposing ends of said secondary pipe portions, said annular recesses defining two opposing shoulder portions of said respective opposing secondary pipe portions, each of said shoulder portions extending radially inwardly toward said primary pipe portions, said thermal movement resistance means further including two anchor plates having an inner edge and an outer edge, said anchor plates being received in opposing annular spaces defined between opposing primary and secondary pipe portions of said two pipe components, said anchor plates extending radially from said primary pipe portion into said secondary pipe recess to abuttingly engage said shoulder portions of said recesses, said anchor plates further being attached to said primary pipe portions at inner edges thereof and attached at said outer edges thereof to said secondary pipe portions, whereby said shoulders provide interior support surfaces on opposing sides of said joint which resist thermal expansion and contraction movements of said primary pipe portions.

11. An improved electrofusion weld assembly for forming a fusion weld between first and second opposing thermoplastic double containment pipe sections, said first double containment pipe section having a first outer pipe and a first inner pipe disposed within the first outer pipe such that said first outer pipe is spaced apart from the first inner pipe by a first annular space, said second double containment pipe section having a second outer pipe and a second inner pipe disposed within the second outer pipe such that said second outer pipe is spaced apart from the second inner pipe by a second annular space, said first and second inner pipes being interconnected by a coupling, the weld assembly comprising:

first and second annular shoulders formed in respective opposing end portions of said first and second outer pipes; first and second anchors respectively disposed in said first and second annular spaces, the first and second anchors having respective first and second openings defined by respective first and second inner edges, said first and second anchors being respectively connected to said first and second inner pipes and spaced apart from each other, said first and second anchors further having respective first and second outer edges respectively bearing upon said first and second annular shoulders; an elongated thermoplastic welding sleeve having a preselected length and a generally constant inner diameter which closely approximates the outer diameter of said outer pipes of said first and second outer pipes, the welding sleeve having at least one electrical resistance member embedded therein and disposed generally adjacent the inner diameter thereof, said resistance member defining two electrofusion welding zones of said welding sleeve; and, at least one clamping member for insertion over said sleeve and for applying external pressure to said sleeve adjacent one of said two electrofusion welding zones and for maintaining said welding sleeve in intimate contact with one of said first and second outer pipes, the clamping member having at least two interacting portions having an internal opening for receiving said sleeve therein, the clamping member portions, when assembled together having an internal pressure face, the pressure face having a central groove disposed between two radially extending land portions, the groove being approximately no greater than a width of one of said sleeve electrofusion welding zones.

12. The weld assembly as defined in claim 11, wherein said electrical resistance member is embedded in said welding sleeve and is generally aligned with a longitudinal axis of said sleeve.

13. The weld assembly as defined in claim 11, wherein said clamping member portions include two semi-circular halves which are hingedly joined together and said clamping member includes means for exerting pressure on said welding sleeve.

14. The weld assembly of claim 11, wherein one of said first and second anchors is attached at its inner edge to said coupling.

15. A joint in a thermoplastic double containment piping system between opposing first and second thermoplastic double containment pipe components, the first double containment pipe component having a first primary pipe portion surrounded by a first secondary pipe portion, the second double containment pipe component having a second primary pipe portion surrounded by a second secondary pipe portion, said joint comprising: a first sleeve member joining said first and second primary pipe portions together, a second sleeve member joining said first and second secondary pipe portions together, means for resisting thermal movement of said first and second primary pipe portions relative to said first and second secondary pipe portions during operation of said piping system, said thermal movement resistance means including at least one restraint surface disposed on an interior surface of said first secondary pipe portion and proximate to an end of said first secondary pipe, said restraint surface extending radially inwardly toward one of said first and second primary pipe portions, said thermal movement resistance means further including an anchor extending between said first secondary pipe portion and said one primary pipe portion, said anchor including opposing inner and outer edges, a portion of said anchor outer edge engaging said restraint surface and a portion of said anchor inner edge being connected to said one primary pipe portion, whereby said restraint surface and said anchor cooperate to resist thermally-induced movements of said primary pipe portions.

16. A pipe joint as defined claim 15, wherein said anchor is connected to said one primary pipe portion by plastics welding.

17. A pipe joint as defined in claim 15, wherein said first sleeve member includes a coupling joining said first and second primary pipe portions together and said anchor inner edge is connected to said one primary pipe portion at said coupling.

18. A pipe joint as defined in claim 15, wherein said thermal resistance means further includes a second restraint surface disposed on an interior surface of said second secondary pipe portion, and a second anchor having outer and inner edges, at least a portion of said second anchor inner edge being connected to said second primary pipe portion and at least a portion of said second anchor outer edge engaging said second restraint surface.

19. A pipe joint as defined in claim 18, wherein said restraint surface includes an annular shoulder formed in said first secondary pipe portions.

20. A pipe joint between two opposing sections of thermoplastic double containment pipe sections wherein each pipe section has a primary pipe disposed within a surrounding secondary pipe, the joint comprising: means joining said opposing primary pipes together such that said two opposing primary pipes share a single longitudinal axis, means joining said opposing secondary pipes together in a coaxial relationship with respect to said opposing primary pipes, means for anchoring said opposing primary pipes with respect to said surrounding secondary pipes so as to resist longitudinal expansion forces developed in said two opposing primary pipes relative to said surrounding secondary pipes, said anchoring means including at least one anchor surface formed in one of said opposing secondary pipes, said anchoring surface extending generally transverse to said primary pipes longitudinal axis, said anchoring means further including an anchor extending transversely between said opposing secondary pipes and said opposing primary pipes, said anchor having two opposing end portions, one of said end portions being rigidly attached to at least one of said opposing primary pipes and the other end portion being disposed adjacent said anchoring surface such that said anchor abuts said anchor surface and said anchor other end portion further being attached to one of said opposing secondary pipes, whereby said anchoring surface provides resistance to longitudinal forces induced in said opposing primary pipes.

21. An improved electrofusion weld assembly for forming a fusion weld between two opposing thermoplastic pipe sections having approximately the same outer diameter, the electrofusion weld assembly comprising, in combination:

an elongated thermoplastic welding sleeve having a preselected length and a generally constant inner diameter which closely approximates the outer diameter of said two pipe sections, the sleeve having electrical resistance wire embedded in said sleeve at the inner diameter thereof, said resistance wire forming two electrofusion welding zones of said sleeve, and a clamping member for insertion over said sleeve and for applying pressure to said sleeve when inserted over said two pipe sections, the clamping member having at least two interacting portions which cooperate to define an opening for receiving said sleeve therein, the clamping member interacting portions when assembled together having an internal pressure face, the pressure face having a central groove portion disposed between two radially extending land portions, the groove portion being approximately no greater than a width of one of said sleeve electrofusion welding zones.

* * * * *